Figure 1:
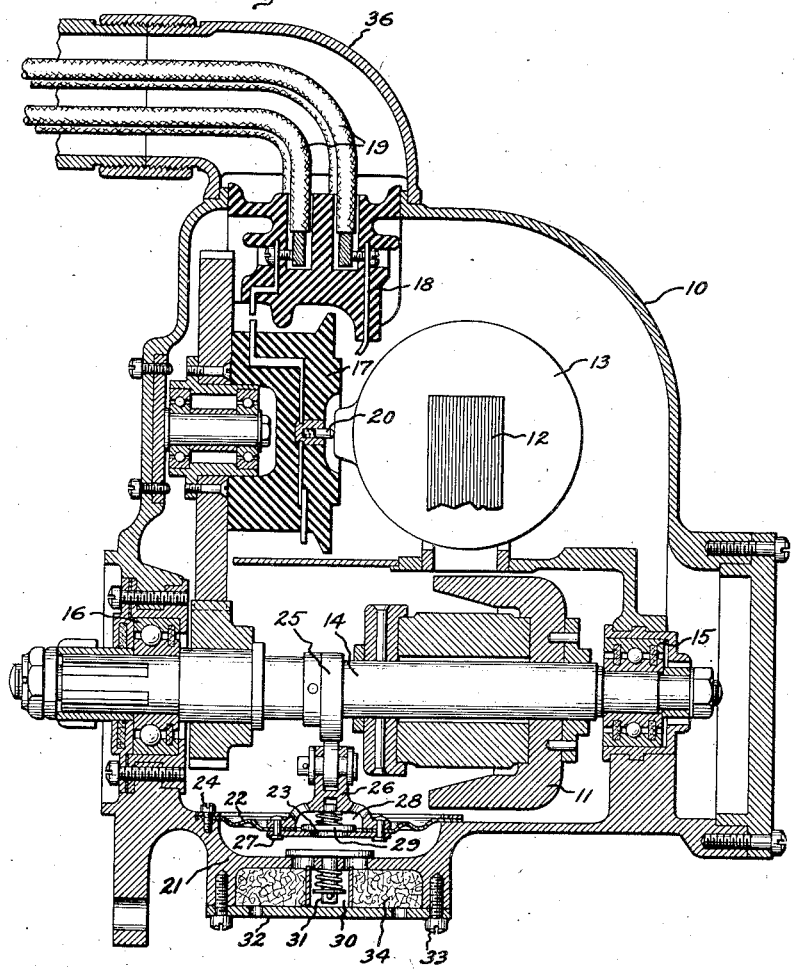

July 8, 1941.  A. C. WALL  2,248,594

ELECTRIC IGNITION DEVICE

Filed Feb. 29, 1940  2 Sheets-Sheet 1

Inventor:
Alexander C. Wall,
by Harry E. Dunham
His Attorney.

July 8, 1941. A. C. WALL 2,248,594
ELECTRIC IGNITION DEVICE
Filed Feb. 29, 1940 2 Sheets-Sheet 2

Inventor:
Alexander C. Wall,
by Harry E. Dunham
His Attorney.

Patented July 8, 1941

2,248,594

UNITED STATES PATENT OFFICE 2,248,594

ELECTRIC IGNITION DEVICE

Alexander C. Wall, Schenectady, N. Y., assignor to General Electric Company, a corporation of New York Application February 29, 1940, Serial No. 321,472

6 Claims. (Cl. 171—209)

My invention relates to an electric ignition apparatus and more particularly to an arrangement for supercharging the ignition apparatus.

As aircraft are designed to fly at increasingly higher altitudes the problem of preventing flash-over between the parts of the electric ignition equipment which are at relatively different potentials presents itself, since the dielectric effect of air in rarified atmospheres is less than at atmospheric pressure. This problem has usually been met by increasing the distances between the parts of the electric ignition system which are at relatively different potentials. This structure has the disadvantage of increasing the resulting size of the electric ignition equipment. It has also been proposed to put electric devices in the electric ignition circuit so as to lessen this phenomenon of flash-over or after-current.

An object of my invention is to provide electric ignition equipment for use on aircraft which are designed to fly at high altitudes, which is simple in construction, efficient in operation and economical to manufacture.

I accomplish these and other objects by providing an arrangement for supercharging the electric ignition equipment which contain parts which are at relatively different potentials. My improved arrangement for accomplishing this supercharging includes a pump which is placed inside the casing which surrounds the electric ignition equipment. It has already been suggested to supercharge ignition equipment by connecting the equipment to some source of air pressure outside the ignition equipment, such as the supercharged cabin or an extra pump. My improved arrangement, however, dispenses with the use of long lines of piping and other extra equipment, such as a separate power source to drive the separate supercharger, since my entire pump mechanism is within the ignition equipment. Thus my entire ignition supercharging mechanism is light in weight which is extremely important in equipment designed for high speed, high altitude aircraft. Furthermore, my improved arrangement is highly reliable since there is no extra equipment to fail. In addition my improved arrangement is simple in construction which facilitates both assembly and servicing, since it is self-contained.

Further objects and advantages of my invention will become apparent as the following description proceeds and the features of novelty which characterized my invention will be pointed out with particularity in the claims annexed to and forming a part of this specification.

Figure 2:
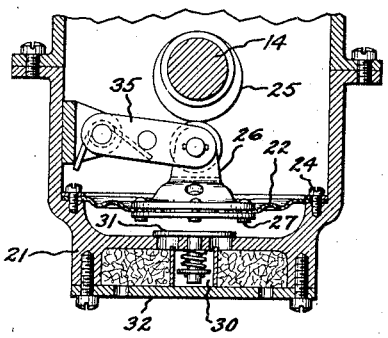
Figure 3:
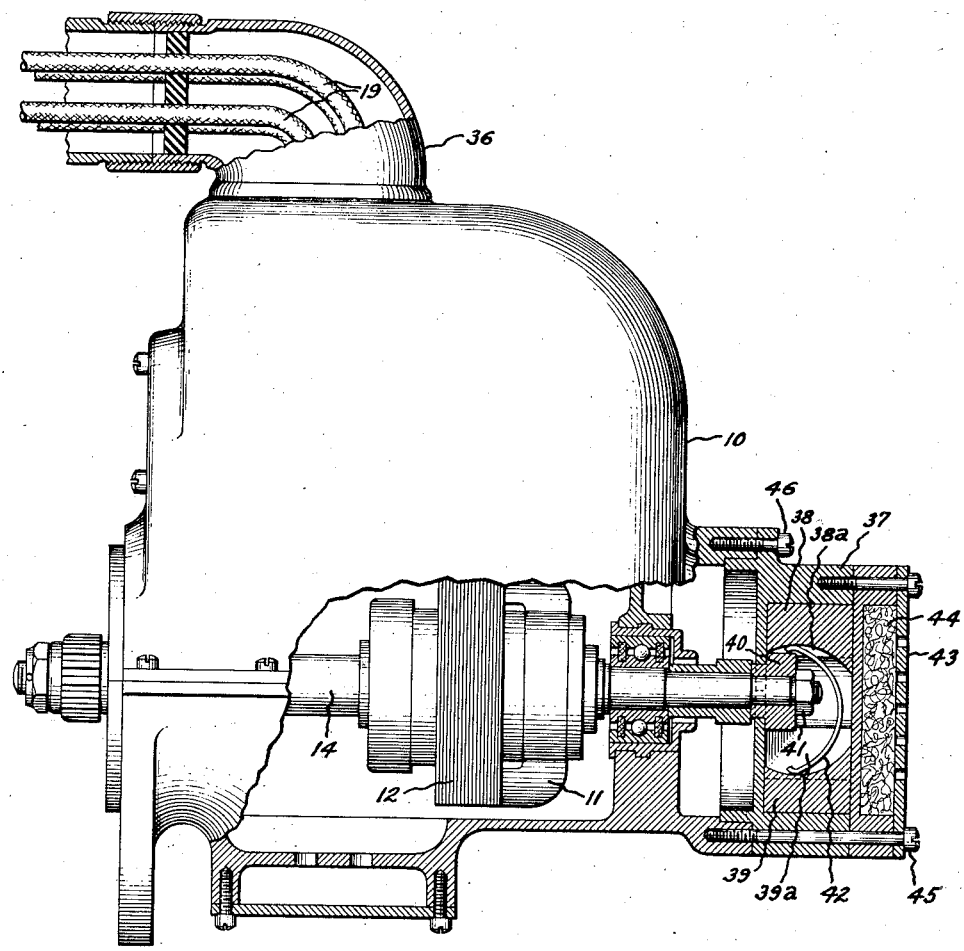
Figure 4:
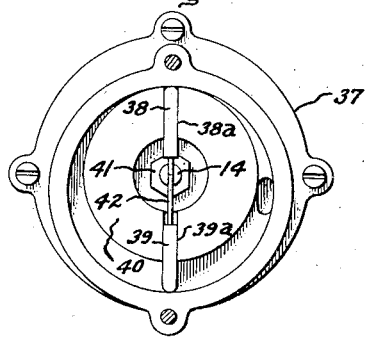

In the drawings, Fig. 1 is a sectional side elevation of an electric ignition device provided with an embodiment of my invention; Fig. 2 is a partial sectional end elevation of a portion of the device illustrated in Fig. 1; Fig. 3 is a side elevation in partial section of an electric ignition device provided with a modification of my invention; and Fig. 4 is an end view of a portion of the electric ignition device illustrated in Fig. 3.

Referring to the drawings, in Figs. 1 and 2 I have illustrated a conventional magneto distributor arrangement having an enclosing casing 10. This magneto distributor arrangement may be of any suitable type and in the illustrated embodiment of my invention includes a magneto of the conventional type having rotating magnets 11 which cooperate with a core member 12 and a coil member 13. The rotating magnets 11 are suitably supported on a shaft member 14 which in turn rotates in conventional bearings 15 and 16. The distributor which distributes the current from the coil member 13 to the spark plugs in an internal combustion engine includes a rotating contact member 17 which cooperates with a series of stationary contacts 18. These stationary contacts 18 are connected to the spark plugs through wires 19. The rotating contact 17 of the distributor will therefore receive current from the high voltage secondary winding of the coil member 13 through a contact 20 and upon rotation will distribute the ignition current in the conventional manner to the spark plugs in proper timing.

In order to provide an arrangement for supercharging or raising the pressure within the casing, over that which obtains outside the casing when the airplane is at high altitudes, I provide a pressure increasing arrangement, such as a pump member 21 which may be of any suitable type. As illustrated in Figs. 1 and 2, this pump member is of the diaphragm type and includes a diaphragm 22 having a port 23 therein. The diaphragm is tightly held against the casing 10 in any suitable manner, such as by bolts 24. The diaphragm member is actuated through a cam member 25 which is placed on the shaft member 14, and a cooperating bracket member 26 which is fixedly attached to the diaphragm member in any suitable manner, such as by rivets 27. The bracket member 26 forms with the diaphragm member an enclosed space 28 around the port 22 in the diaphragm. Within this enclosed space 28 there is a port closure member 29 which is biased towards the port to keep it in its closed position. The portion of the casing adjacent the diaphragm member 22 also has a port 30 with a spring-biased port closure member 31 therein which normally keeps the port closed. A perforated plate 32 may be placed over the port and attached to the casing in any suitable manner, such as by bolts 33. Screening material 34 may be placed, if desired, between the plate member and the port 31 so as to filter the air which passes therethrough.

It will be seen from an inspection of Figs. 1 and 2 that upon rotation of the shaft member 14, the cam member 25 will actuate the diaphragm 22 with the attending result that air will be pumped from outside of the casing 10 to inside thereof. As will be seen in Fig. 2, the cam member 25 will depress the diaphragm downwardly, the diaphragm member moving upwardly due to the spring-biased link member 35. Thus, it will be seen that I have provided a pump inside the magneto distributor casing 10 for raising the pressure of the atmosphere within the casing. In the construction shown, supercharging is limited to the magneto distributor casing, the pressure being so confined by the distributor block. However, if it is desired to supercharge the harness which includes the wires 19 and a conduit 36, this can readily be accomplished by providing air passages into the conduit through the distributor block.

Figs. 3 and 4 illustrate a modification of the supercharger electric ignition equipment illustrated in Figs. 1 and 2. In Fig. 3 there is illustrated a magneto distributor ignition equipment similar to that illustrated in Fig. 1, except that a rotary pump is applied to a different portion of the casing 10 than that to which the diaphragm pump was applied in Fig. 1. Axially disposed from the end of the shaft member 14, I have placed a rotary pump member 37. As will be seen in Fig. 4, this pump member includes a plurality of vane members 38 and 39 which are positioned in slots 38a and 39a respectively of a vane block 40 which is held to the shaft 14 by a nut 41. A spring member 42 is used to keep the vanes in position. Adjacent the pump member, I provide a perforated cap member 43. Between the perforated cap member and the pump there may be placed, if desired, any suitable screening material 44 for filtering the air which passes through the pump. The entire pump mechanism 37 may be bolted to the casing 10 by any suitable means, such as bolts 45 and 46.

It will be seen, therefore, that I have described my invention as applied in a conventional, totally-enclosed magneto distributor ignition equipment but it is, of course, to be understood that my improved supercharging arrangement may be also applied in any type of electric ignition equipment, such as, a battery ignition arrangement, a distributor alone, or a magneto alone.

In view of the foregoing, it will be seen that I have provided an improved electric ignition device which may have efficient operation when applied to aircraft which are designed for high altitude flying.

While I have shown a particular embodiment of my invention, I do not desire my invention to be limited to the particular constructions shown and described and I intend in the appended claims to cover all modifications within the spirit and scope of my invention.

What I claim as new and desire to secure by Letters Patent of the United States is:

1. An electric ignition apparatus for an airplane which is adapted to fly in rarified atmospheres including a substantially air tight enclosing casing for said ignition apparatus, means for connecting said enclosing casing with atmosphere outside said enclosing casing, and pressure increasing means within said enclosing casing, said pressure increasing means having its intake side in connection with said communicating means so that upon actuation of said pressure increasing means said apparatus within said casing will be supercharged to a pressure substantially higher than the pressure of atmosphere outside said casing.

2. An electric ignition apparatus for an airplane which is adapted to fly in rarified atmospheres including a magneto, a distributor, a substantially air tight enclosing casing for said ignition apparatus, means for connecting said enclosing casing with atmosphere outside said enclosing casing, and pressure increasing means within said enclosing casing, said pressure increasing means having its intake side in connection with said communicating means so that upon actuation of said pressure increasing means said apparatus within said casing will be supercharged to a pressure substantially higher than that of the atmosphere outside said casing.

3. A magneto including a rotatable shaft, a substantially air tight enclosing casing for said magneto, a port in said casing, pressure increasing means within said enclosing casing, said pressure increasing means having its intake side in substantially air tight communication with said port, and means for actuating said pressure increasing means from said shaft so that upon rotation thereof the pressure within said magneto enclosing casing will be built up to a value substantially higher than the pressure outside said enclosing casing.

4. A magneto distributor device including a rotatable shaft, a substantially air tight enclosing casing for said device, a port in said casing, pressure increasing means within said enclosing casing, said pressure increasing means having its intake side in substantially air tight communication with said port, and means for actuating said pressure increasing means through said shaft so that upon rotation thereof the pressure within said device enclosing casing will be built up to a value substantially higher than the pressure outside said enclosing casing.

5. A magneto including a rotatable shaft, a magnetic inductor on said shaft, a coil adapted to react electro-dynamically with said inductor so that an ignition current will be induced in said coil, a substantially air tight enclosing casing for said magneto, a port in said enclosing casing, pressure increasing means within said enclosing casing, said pressure increasing means having its intake side in substantially air tight communication with said port so that upon actuation of said pressure increasing means said casing will be supercharged to a pressure substantially higher than the pressure of atmosphere outside said casing.

6. A magneto-distributor device including a rotatable shaft, a substantially air tight enclosing casing for said device, a port in said casing, pressure increasing means within said enclosing casing, said pressure increasing means having its intake side in substantially air tight communication with said port, a conduit connected to said casing and having conductors therein adapted to connect said magneto-distributor device to spark plugs, an air passage between said conduit and said casing, and means for actuating said pressure increasing means through said shaft so that upon rotation thereof the pressure within said device enclosing casing and said conduit will be built up to a value substantially higher than the pressure outside said enclosing casing.

ALEXANDER C. WALL.

DISCLAIMER 2,248,594.—*Alexander C. Wall*, Schenectady, N. Y. ELECTRIC IGNITION DEVICE.
    Patent dated July 8, 1941. Disclaimer filed July 29, 1943, by the assignee, *General Electric Company*.
  Hereby enters this disclaimer to claims 1, 2, 3, 4, 5, and 6 in said specification.
    [*Official Gazette August 24, 1943.*]